(12) United States Patent
Browne et al.

(10) Patent No.: US 11,713,735 B2
(45) Date of Patent: Aug. 1, 2023

(54) INTERNAL COMBUSTION ENGINE

(71) Applicant: JCB Research, Uttoxeter (GB)

(72) Inventors: Kevin Browne, Uttoxeter (GB); Paul McCarthy, Uttoxeter (GB)

(73) Assignee: JCB Research, Uttoxeter (GB)

( * ) Notice: Subject to any disclaimer, the term of this patent is extended or adjusted under 35 U.S.C. 154(b) by 0 days.

(21) Appl. No.: 17/955,518

(22) Filed: Sep. 28, 2022

(65) Prior Publication Data

US 2023/0095893 A1    Mar. 30, 2023

(30) Foreign Application Priority Data

Sep. 28, 2021   (GB) ..................................... 2113870

(51) Int. Cl.
*F02M 21/02*   (2006.01)
*F02B 43/10*   (2006.01)

(52) U.S. Cl.
CPC .... *F02M 21/0281* (2013.01); *F02M 21/0206* (2013.01); *F02M 21/0275* (2013.01); *F02B 43/10* (2013.01)

(58) Field of Classification Search
CPC ........... F02M 21/0281; F02M 21/0206; F02M 21/0275; F02B 43/10; F02B 2043/103
See application file for complete search history.

(56) References Cited

U.S. PATENT DOCUMENTS

| | | | |
|---|---|---|---|
| 5,293,851 A | 3/1994 | Schaub | |
| 7,789,047 B2* | 9/2010 | Kuroki | ................ F02D 19/0628 |
| | | | 123/3 |
| 9,677,459 B2* | 6/2017 | McClendon | ........ F02B 19/1014 |
| 2005/0229872 A1* | 10/2005 | Lange | ..................... F02B 43/12 |
| | | | 123/585 |

FOREIGN PATENT DOCUMENTS

| | | |
|---|---|---|
| GB | 470404 A | 8/1937 |
| WO | WO-2008/005484 A1 | 1/2008 |

OTHER PUBLICATIONS

Search Report issued in GB 2113870.6, dated Nov. 3, 2021.

\* cited by examiner

*Primary Examiner* — Syed O Hasan
(74) *Attorney, Agent, or Firm* — Marshall, Gerstein & Borun LLP

(57) ABSTRACT

An internal combustion engine for use with hydrogen fuel, the engine having at least one cylinder assembly which includes a combustion chamber having a cylinder, a cylinder head and a reciprocating piston assembly, the cylinder defining a cylinder longitudinal axis; a fuel injector for injecting fuel into the combustion chamber, the fuel injector defining an injector longitudinal axis; and a fuel flow director, wherein the fuel flow director is located in the fuel flow path between an outlet of the fuel injector and the combustion chamber. The fuel injector is oriented such that the injector longitudinal axis extends at a first angle; and the fuel flow director is configured to direct fuel flow into the combustion chamber at a second angle, different to the first angle.

12 Claims, 14 Drawing Sheets

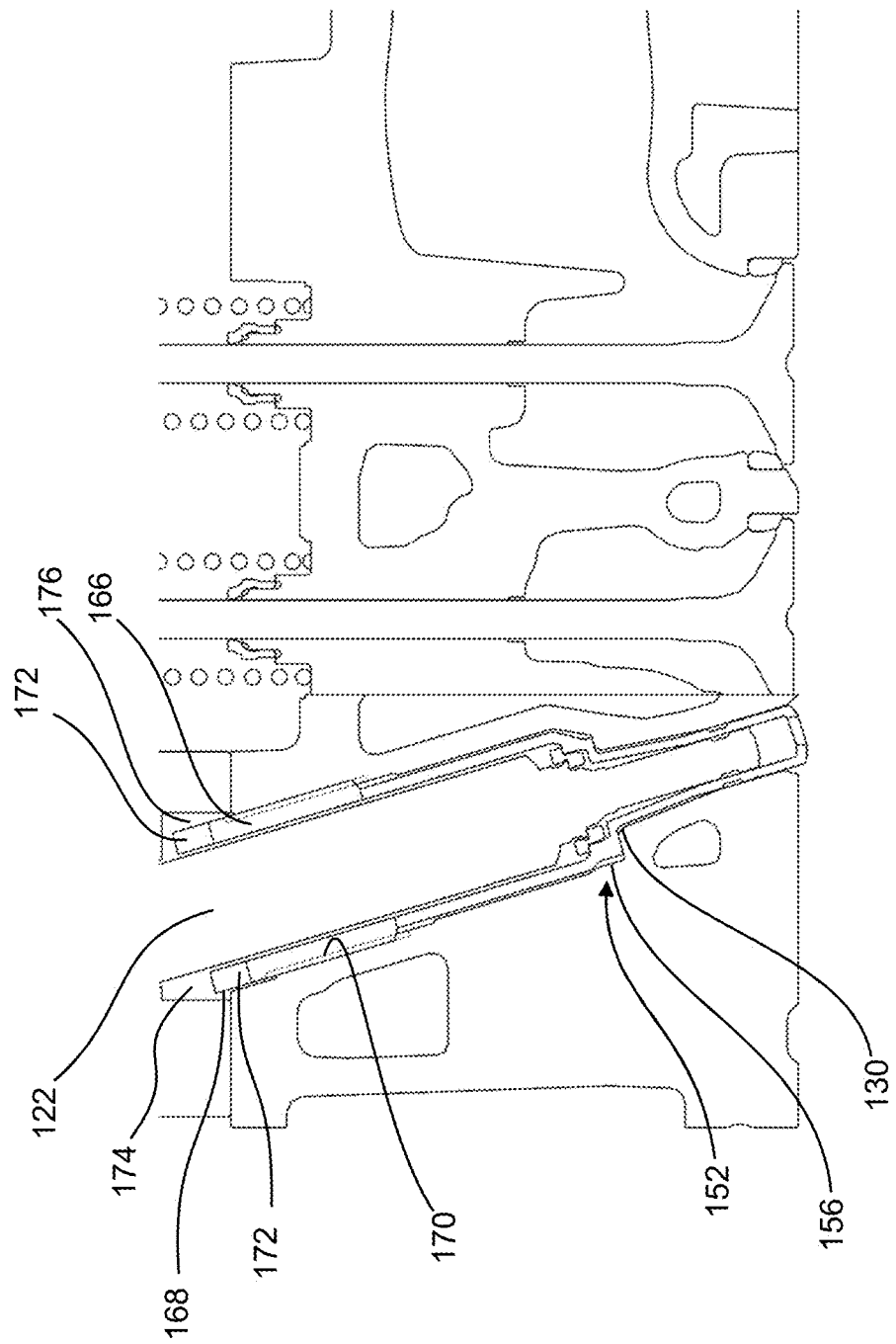

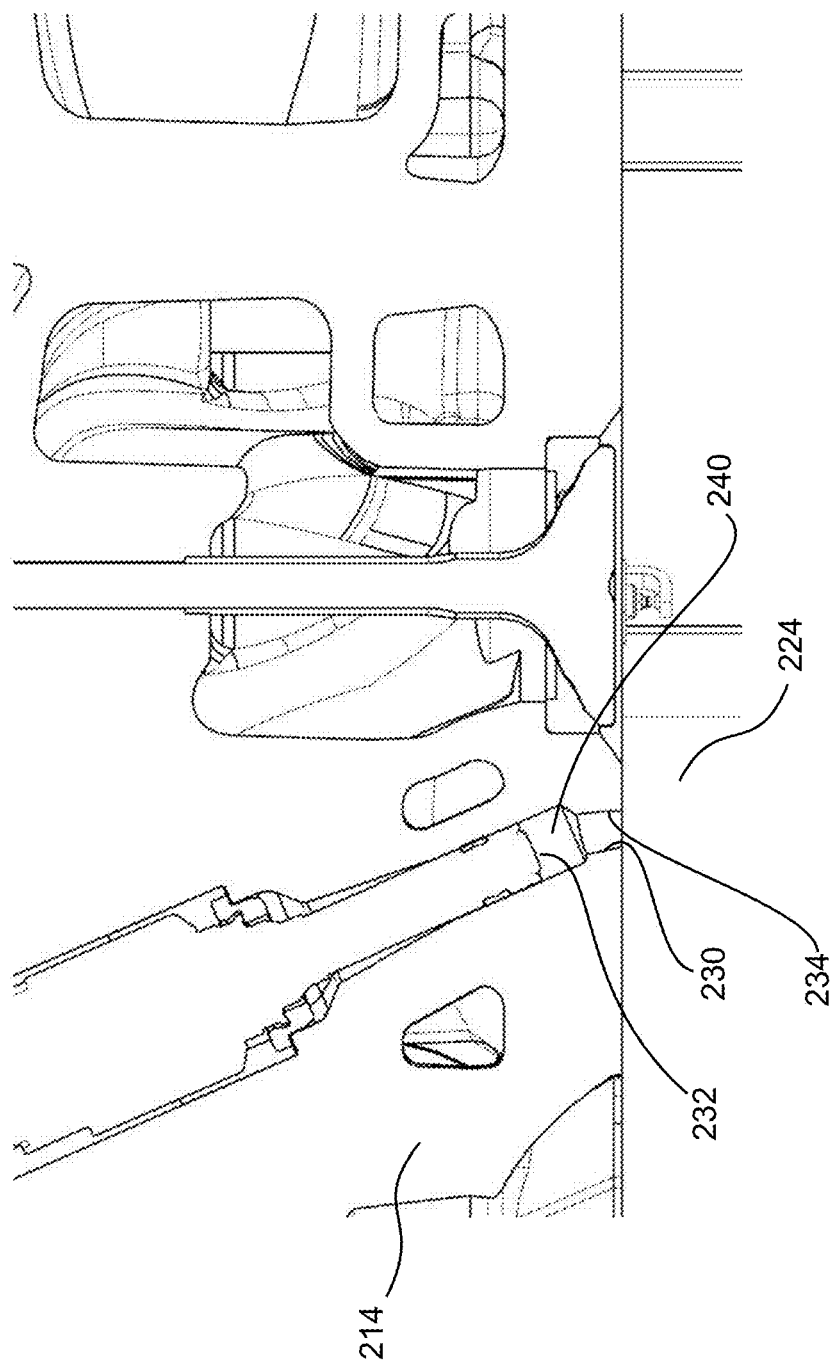

INTERNAL COMBUSTION ENGINE

FIELD

The present invention relates to an internal combustion engine for use with hydrogen fuel.

BACKGROUND

Fuel is commonly introduced into the combustion chamber of an internal combustion engine, such as an internal combustion engine for hydrogen fuel, by means of a fuel injector. In a direct injection engine, fuel is injected directly into the combustion chamber by the fuel injector. In such a direct injection engine, fuel mixes with air within the combustion chamber prior to combustion initiated by e.g. a spark plug. Combustion of the fuel/air mix and efficiency of the engine are affected by mixing of the fuel and the air. Better mixing of fuel and air leads to better combustion and so better efficiency.

It has been found that optimal mixing of hydrogen fuel and air takes place when the hydrogen fuel is injected into the combustion chamber at an angle parallel to, or substantially parallel to, the longitudinal axis of the cylinder that defines the combustion chamber (i.e. the axis of piston reciprocation within the cylinder). It is known to provide fuel injection at this angle, or at some other desired angle, through alignment of the fuel injector with the desired axis of fuel direction, e.g. aligning the fuel injector with the cylinder longitudinal axis.

Multiple components must be positioned within a cylinder head of an engine. The space envelope into which the engine must fit may be dictated by other components of a machine or vehicle. For example, it may be desirable to fit an internal combustion engine for use with hydrogen fuel, where a spark plug is required, into the space envelope for a diesel internal combustion engine, where a spark plug was not required. It can therefore be difficult to position components within the cylinder head in an optimum position and/or at an optimum orientation.

In particular, it may not be possible to position and/or orientate a fuel injector within a cylinder head as desired. This is of particular importance in a direct injection engine, as fuel is injected directly into the combustion chamber by the fuel injector.

The fuel injector must be positioned around components such as inlet and exhaust ports. Such design restrictions can prevent orientation of the fuel injector to optimize the direction of fuel injection into the combustion chamber.

It may be desirable to keep cylinder head fixings in the same configuration as in other types of internal combustion engine, to improve ease of manufacture through standardization of components. Such a consideration further constrains freedom to position and orientate the fuel injector as required.

Without the desired direction of fuel injection into the combustion chamber, the flow of fuel into the combustion chamber may be such that optimal mixing of fuel with air may not take place, so decreasing engine efficiency.

The present teachings seek to overcome or at least mitigate the problems of the prior art

SUMMARY

According to a first aspect of the present teachings, there is provided an internal combustion engine for use with hydrogen fuel, the engine having at least one cylinder assembly, the or each cylinder assembly comprising a combustion chamber comprising a cylinder, a cylinder head and a reciprocating piston assembly, the cylinder defining a cylinder longitudinal axis; a fuel injector for injecting fuel into the combustion chamber, the fuel injector defining an injector longitudinal axis; and a fuel flow director, wherein the fuel flow director is located in the fuel flow path between an outlet of the fuel injector and the combustion chamber. The fuel injector is oriented such that the injector longitudinal axis extends at a first angle; and the fuel flow director is configured to direct fuel flow into the combustion chamber at a second angle, different to the first angle.

Providing a fuel flow director for directing fuel flow into the combustion chamber at a different angle to the longitudinal axis of the fuel injector allows the direction of fuel injection into the combustion chamber to differ from the angle of orientation of the fuel injector. As the direction of fuel flow into the combustion chamber is not solely dictated by the orientation of the fuel injector, greater design freedom is provided. A particular advantage is provided where there is a desired angle of fuel injection, but design constraints prevent the orientation of the fuel injector at that angle.

In exemplary embodiments, the first angle is a non-zero angle in relation to the cylinder longitudinal axis.

In exemplary embodiments, the second angle is within 30° of the angle of the cylinder longitudinal axis.

In exemplary embodiments, the second angle is within 15° of the angle of the cylinder longitudinal axis.

In exemplary embodiments, the second angle is within 10° of the angle of the cylinder longitudinal axis.

In exemplary embodiments, the second angle is within 5° of the angle of the cylinder longitudinal axis.

In exemplary embodiments, the second angle is substantially parallel to the cylinder longitudinal axis.

In exemplary embodiments, the second angle is parallel to the cylinder longitudinal axis.

It is recognized that optimal mixing of hydrogen fuel and air takes place when the hydrogen fuel is injected into the combustion chamber at an angle parallel to, or substantially parallel to, the longitudinal axis of the cylinder. Directing the injection of fuel to an angle close to parallel with the cylinder longitudinal axis, or parallel with the cylinder longitudinal axis, improves mixing of hydrogen fuel and air in spite of the fuel injector being at a non-zero angle in relation to the cylinder longitudinal axis.

In exemplary embodiments, the fuel flow director comprises an aperture defined by an internal face, wherein, in use, fuel enters the combustion chamber through the aperture, and wherein the internal face is configured to direct fuel flow into the combustion chamber at the second angle.

The internal face can be effectively used to direct fuel flow. Direction of fuel flow using the internal face of the aperture by which fuel enters the combustion chamber is a simple and effective means of adjusting fuel flow direction—the design of the aperture internal face can be adapted for a particular internal combustion engine layout, i.e. depending on the angle of the fuel injector longitudinal axis.

In exemplary embodiments, the fuel flow director comprises only one aperture.

Such a fuel flow director provides effective directing of fuel flow with, advantageously, low pressure drop across the aperture.

In exemplary embodiments, at least a portion of the internal face is substantially parallel to the second angle.

Such an aperture is an effective means of directing fuel flow in the required direction.

In exemplary embodiments, the cylinder assembly further comprises a sleeve surrounding the fuel injector, wherein the sleeve comprises the fuel flow director.

In exemplary embodiments, the sleeve has a first end that extends over the fuel injector, and a second end that extends beyond an outlet of the fuel injector, wherein the sleeve second end comprises the fuel flow director.

The surrounding sleeve provides an effective means of locating the fuel flow director as required in relation to the fuel injector, such that the fuel flow director angle is as required in relation to the angle of the fuel injector longitudinal axis.

In exemplary embodiments, the sleeve second end defines a chamber between the fuel injector outlet and the fuel flow director.

The chamber volume is configured in proportion to the fuel flow director to optimize the flow of fuel into the combustion chamber.

In exemplary embodiments, the cylinder assembly comprises a head adaptor for locating the fuel injector with respect to the cylinder head, and the head adaptor is integral to the sleeve.

The head adaptor being integral to the sleeve advantageously reduces the number of individual components in the cylinder assembly, as well as serving to locate the fuel flow direction in relation to the cylinder head.

In exemplary embodiments, the fuel flow director is integral to the cylinder head.

In exemplary embodiments, the fuel flow director is defined by the cylinder head.

The fuel flow director being integral to, or defined by, the cylinder head, advantageously reduces the number of individual components in the cylinder assembly, as well as serving to locate the fuel flow direction in relation to the cylinder head.

In exemplary embodiments, the cylinder assembly comprises a sleeve location arrangement configured for the prevention of rotation of the sleeve about the fuel injector longitudinal axis, the sleeve location arrangement comprising a location feature defined by the sleeve and a corresponding location feature defined by the cylinder head.

The sleeve location arrangement advantageously prevents or at least inhibits unwanted movement of the fuel flow director which could lead to the misdirection of fuel flow.

In exemplary embodiments, the piston comprises a crown, and the crown defines an asymmetric depression.

In exemplary embodiments, the crown has a plane extending through the cylinder longitudinal axis, and the depression is asymmetric along the plane.

The asymmetric depression of the crown aids mixing of the fuel and air in the combustion chamber.

In exemplary embodiments, the depression comprises a crown low point distal the cylinder head, wherein the crown low point is offset from the cylinder longitudinal axis.

In exemplary embodiments, the fuel injector is offset from the cylinder longitudinal axis in a first radial direction, and the crown low point is offset from the cylinder longitudinal axis in the first radial direction.

The combination of the location of the low point of the asymmetric depression and the offset location of the fuel injector towards the low point further improves mixing of fuel and air within the combustion chamber.

BRIEF DESCRIPTION OF DRAWINGS

FIG. 13 is a detail cross-sectional view of the cylinder assembly of FIG. 12; and FIG. 14 is a detail cross-sectional view through a cylinder assembly of an internal combustion engine according to yet a further embodiment.

DETAILED DESCRIPTION

Figure 1:
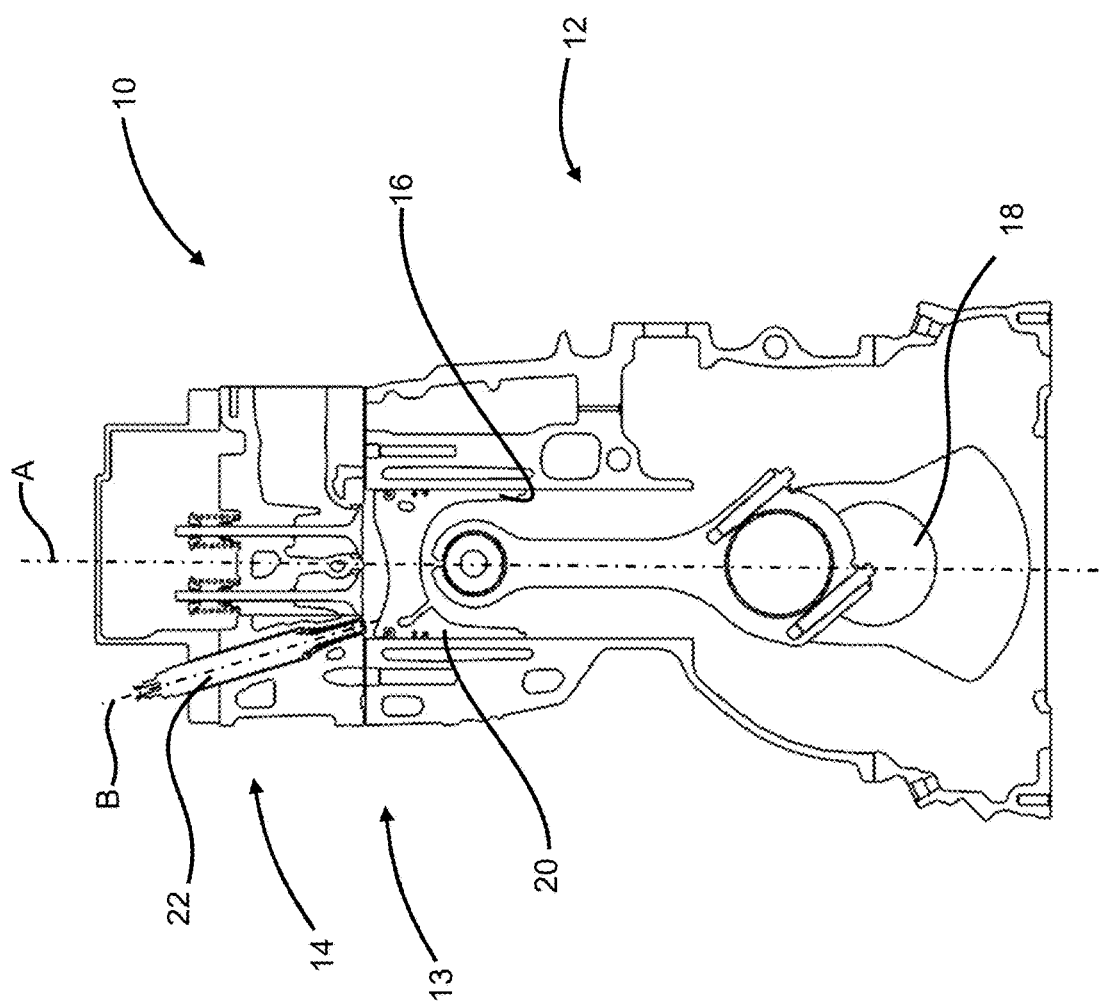
FIG. 1 is a cross-sectional view through a cylinder assembly of an internal combustion engine according to an embodiment, with a piston at top dead center.
Figure 2:
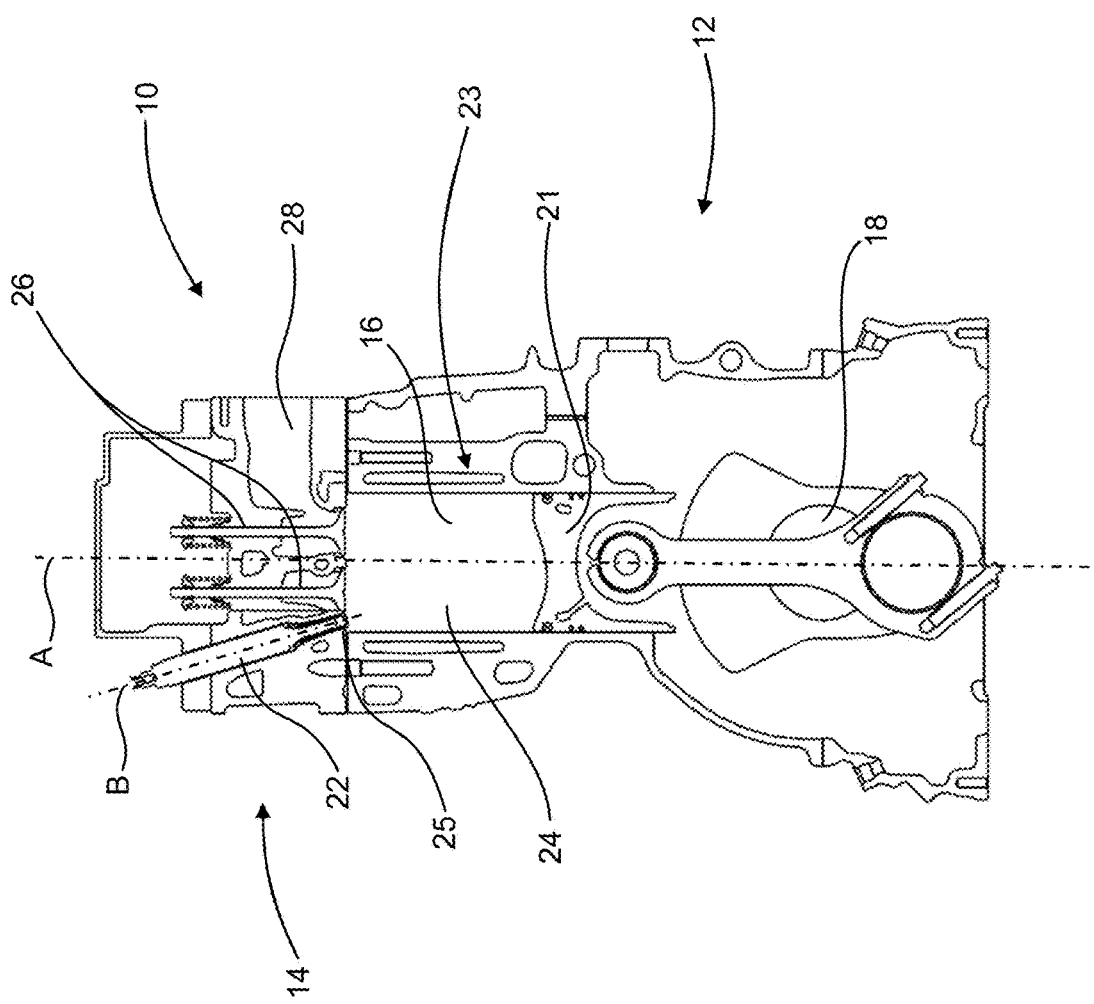
FIG. 2 is a further cross sectional view through the cylinder assembly of FIG. 1, with the piston at bottom dead center.
Figure 3:
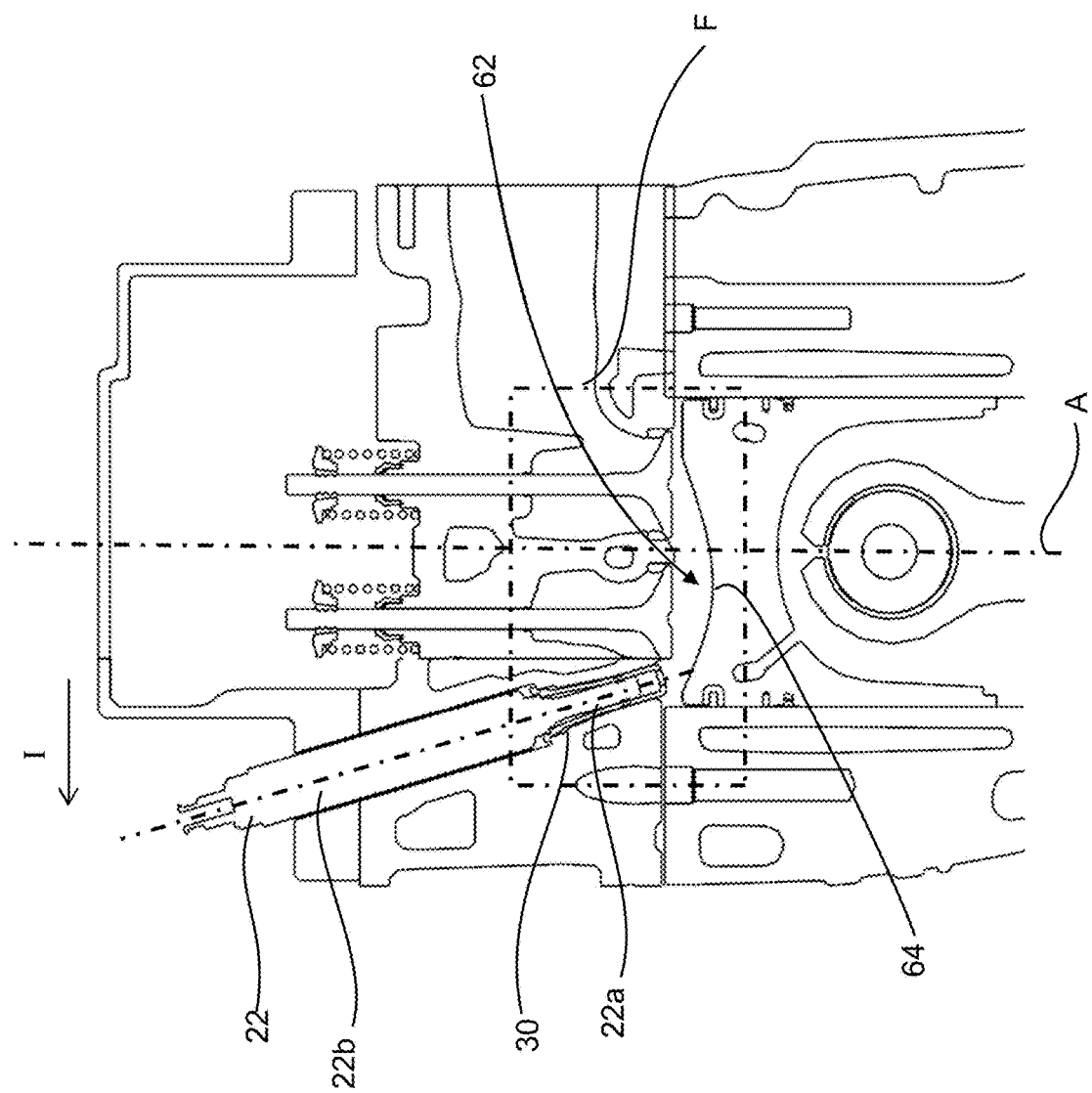
FIG. 3 is a detail cross-sectional view of the cylinder assembly of FIG. 1.
Figure 4:
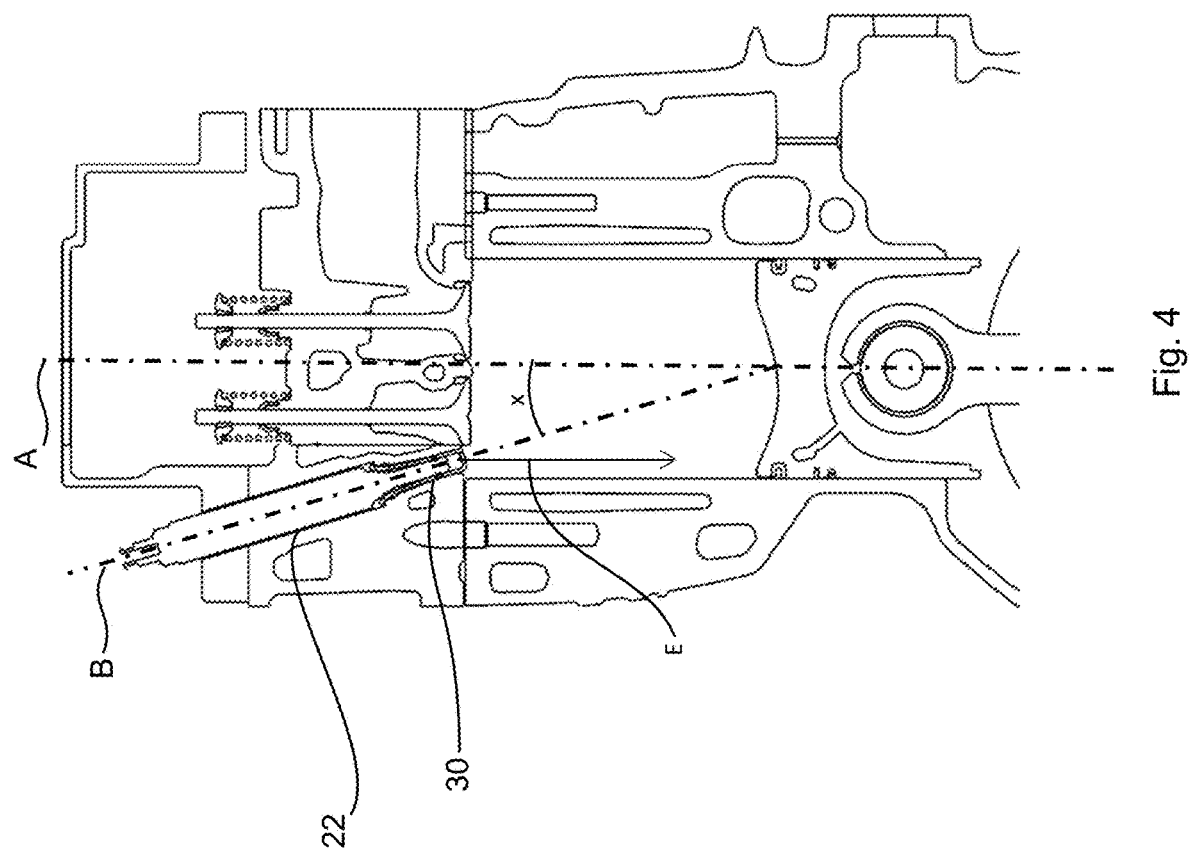
FIG. 4 is a detail cross-sectional view of the cylinder assembly of FIG. 2.

With reference to FIGS. 1 and 2, an internal combustion engine for use with hydrogen fuel is generally indicated at 10.

The internal combustion engine 10 has an engine block 12 and a cylinder head 14. The engine block 12 and the cylinder head 14 define a series of cylinders 16. Each cylinder 16 defines a cylinder longitudinal axis A, as shown in FIGS. 1 and 2.

Each cylinder 16 forms part of a cylinder assembly 23. Each cylinder assembly 23 has a piston assembly 20. FIGS. 1 to 4 show cross sectional views through a single cylinder assembly 23. The remaining cylinder assemblies (not shown) of the internal combustion engine 10 are substantially identical to the cylinder assembly 23 shown.

In this embodiment, the internal combustion engine 10 is a straight four cylinder engine, with four cylinders 16 arranged parallel to one another in a linear formation, and four piston assemblies 20 along a common crank shaft 18. In alternative embodiments, the internal combustion engine has some other known cylinder arrangement, e.g. a straight six or V6.

As shown in FIGS. 1 and 2, the internal combustion engine 10 is of the direct injection type described above. The cylinder assembly 23 includes a fuel injector 22 for injecting fuel directly into a combustion chamber 24 defined by the cylinder 16 and a piston 21 of the piston assembly 20. The fuel injector 22 is mounted to a fuel injection port 25. The fuel injector 22 has a longitudinal axis B. The fuel injector is supported within the cylinder head 14.

The cylinder head 14 is formed within a cylinder head block 13. Each cylinder head 14 comprises two inlet ports 28 for air to be introduced into a combustion chamber 24 defined by the cylinder 16 and the piston assembly 20 and two outlet ports 33 for exhaust gases to be expelled. Through each cylinder head is arranged a spark plug 35 to ignite the hydrogen-air mixture. In this embodiment a single cylinder head block 13 is provided for all four cylinders heads 14 of the internal combustion engine 10, but in other embodiments a separate block may be provided for each cylinder head.

Figure 5:
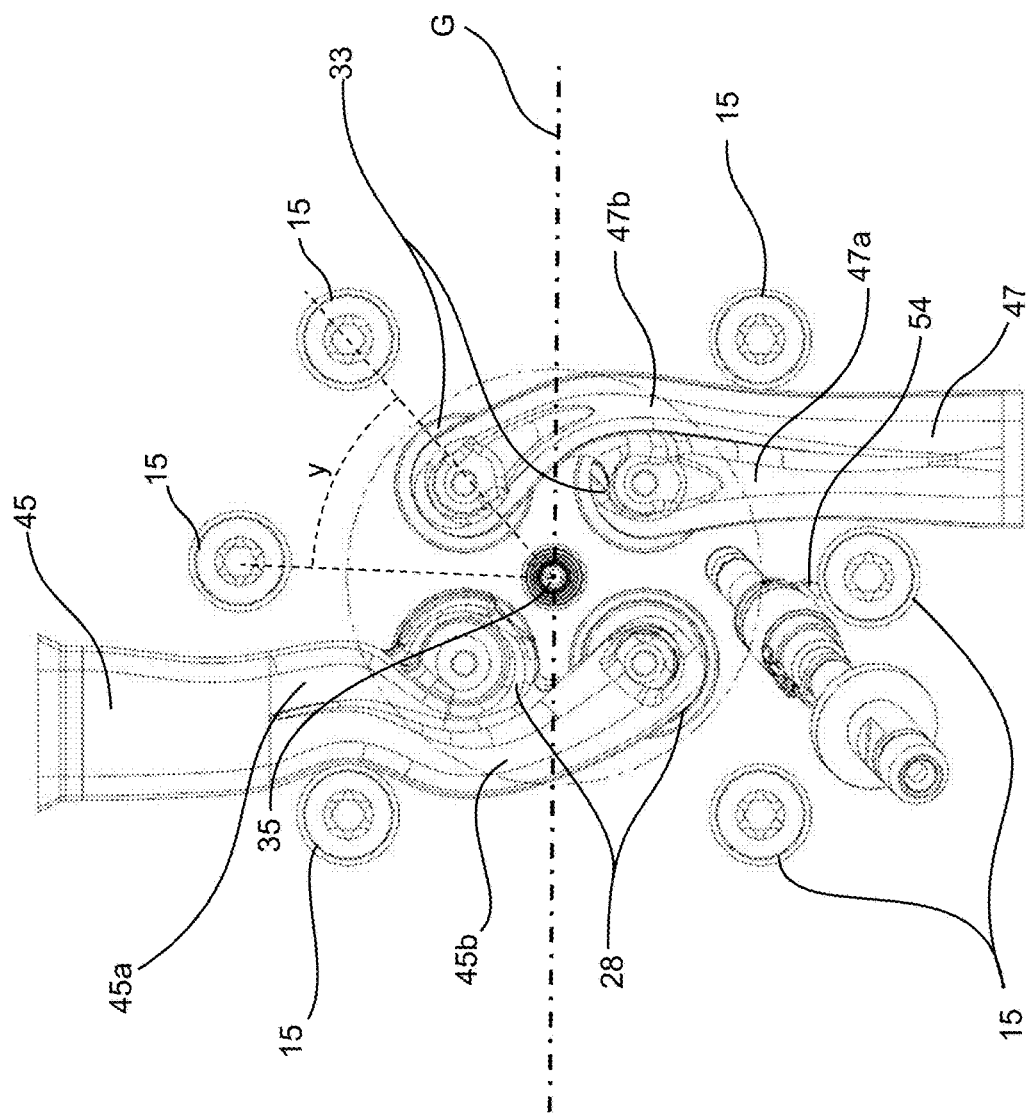
FIG. 5 is a plan view of a portion of the cylinder head of the engine of FIG. 1, showing inlet and outlet valves and runners.

Each cylinder head 14 is secured by six bolts 15 to the engine block 12, as best seen in FIG. 5. The bolts 15 are arranged symmetrically about a plane defined by an axis of rotation C of the crank shaft 18 and the axis A of the cylinder 16. The angle y between two of the adjacent bolts 15 is 46°, however, other angles in the range of 36° to 46° are also envisaged. So called "six bolt heads" are commonly found in compression ignition internal combustion engines—e.g. diesel engines—which operate at higher compression ratios and pressures than spark ignition engines—e.g. gasoline engines. Six bolts are typically required to maintain the integrity of the sealing between the engine block 12 and cylinder head 14 under these higher pressures, whereas gasoline engines typically utilize four bolts. The six bolts 15 restrict the space available to fit supply the combustion chamber with the required air, hydrogen fuel and spark, and allow exhaust gases to be outlet, whilst ensuring the engine runs efficiently and is compact.

Compression ignition engines are commonly used in heavy duty applications where their high torque output at low rpm is beneficial for hauling of heavy loads, providing power to hydraulic pumps driving actuators of working arms of excavators or materials handling vehicles, or driving power take-offs to working implements such as agricultural machinery. When utilizing hydrogen as a fuel in such applications it is also desirable to maintain similar torque characteristics despite the change in fuel and the need to ignite the fuel using a spark.

Figure 6:
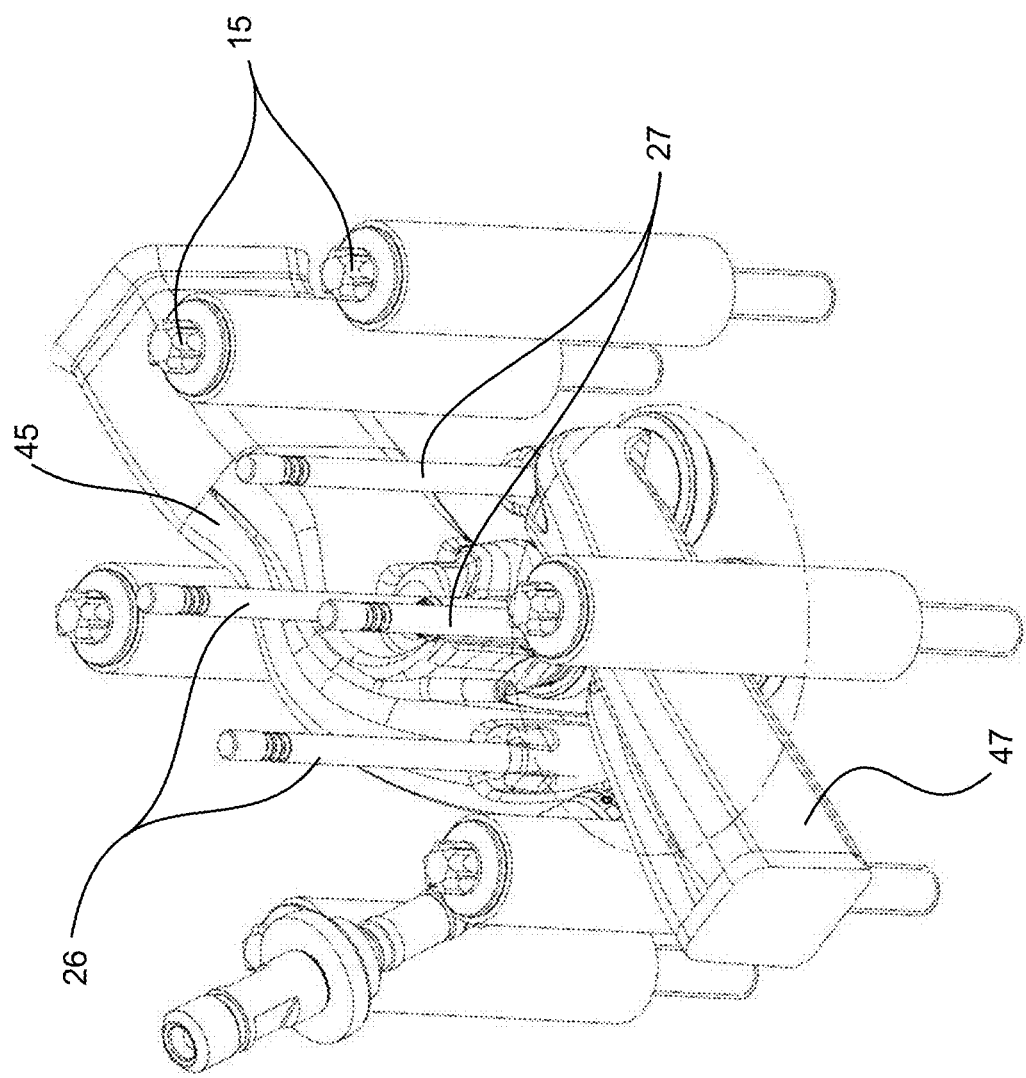
FIG. 6 is an isometric view of the portion of FIG. 5.
Figure 7:
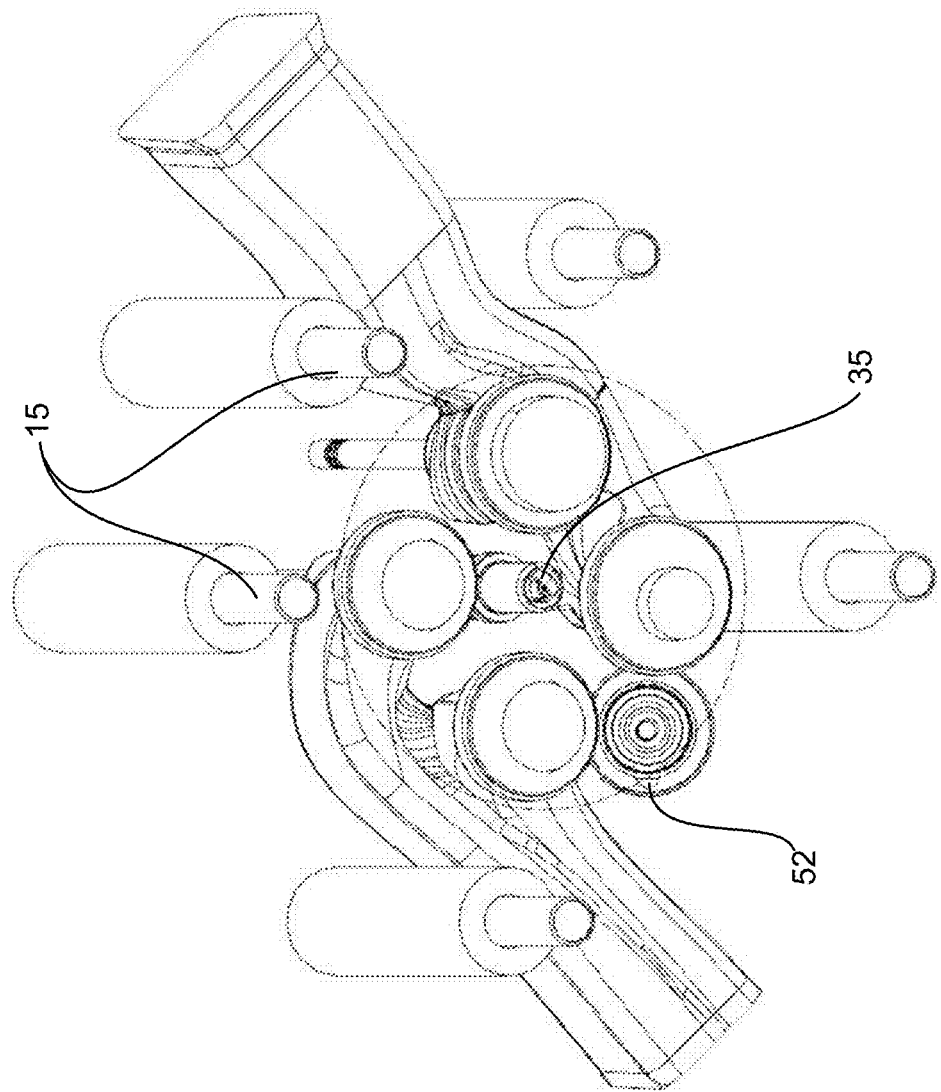
FIG. 7 is an underside flame face view of the portion of FIGS. 5 and 6.

Each inlet port 28 is selectably closable by a corresponding inlet valve 26, whilst each outlet port 33 is closable via a corresponding outlet valve 27 (see FIG. 6). These inlet valves 26 and outlet valves 27 are part of a valve train. The inlet and outlet valves 26, 27 are located, when closed, in the corresponding port 28, 33 in a recessed position from an inner surface of the cylinder head 14. The inlet ports 28 have a larger diameter than that of the outlet ports 33 in order to optimize the airflow into the combustion chamber and achieve an optimized air-hydrogen mixture for lean combustion.

In this embodiment the inlet and outlet valves 26, 27 are arranged to be actuated parallel to axis A. This simplifies the construction of the valve train and cylinder head. In particular, it may enable rocker arms (not shown) for the inlet and outlet valves to pivot about common axes, or at least parallel axes, potentially on a single rocker shaft (not shown) extending the length of the cylinders 16.

The engine 10 further comprises inlet runners 45 arranged to feed into the inlet ports 28 of each cylinder head 14 from an inlet manifold (not shown). As best seen in FIGS. 5 and 6, the inlet runners 45 bifurcate into a first section 45a and a second section 45b, the two sections 45a, 45b being connected to different inlet ports 28. The first and second sections 45a, 45b have non-equal lengths. The inlet runners 45 extend between two of the six bolts 15. In this way, the inlet runners 45 leave more space available to locate components such at the spark plug 35 and fuel injector 22. The inlet runners 45 are shaped such that air enters the combustion chamber 24 in such a direction such that swirl of air is generated about the combustion chamber 24, as indicated by arrow H and discussed in further detail below. The swirling motion is desirable for an efficient and low emission compression ignition combustion.

Similarly, outlet runners 47 connect the outlet ports 33 of each cylinder 16 with an exhaust manifold (not shown) and are bifurcated into a first section 47a and a second section 47b where they connect to each port and merge before connecting to the manifold, and extend between two of the six bolts 15 on the opposite side of the cylinder head 14 to the inlet ports 28.

Figure 9:
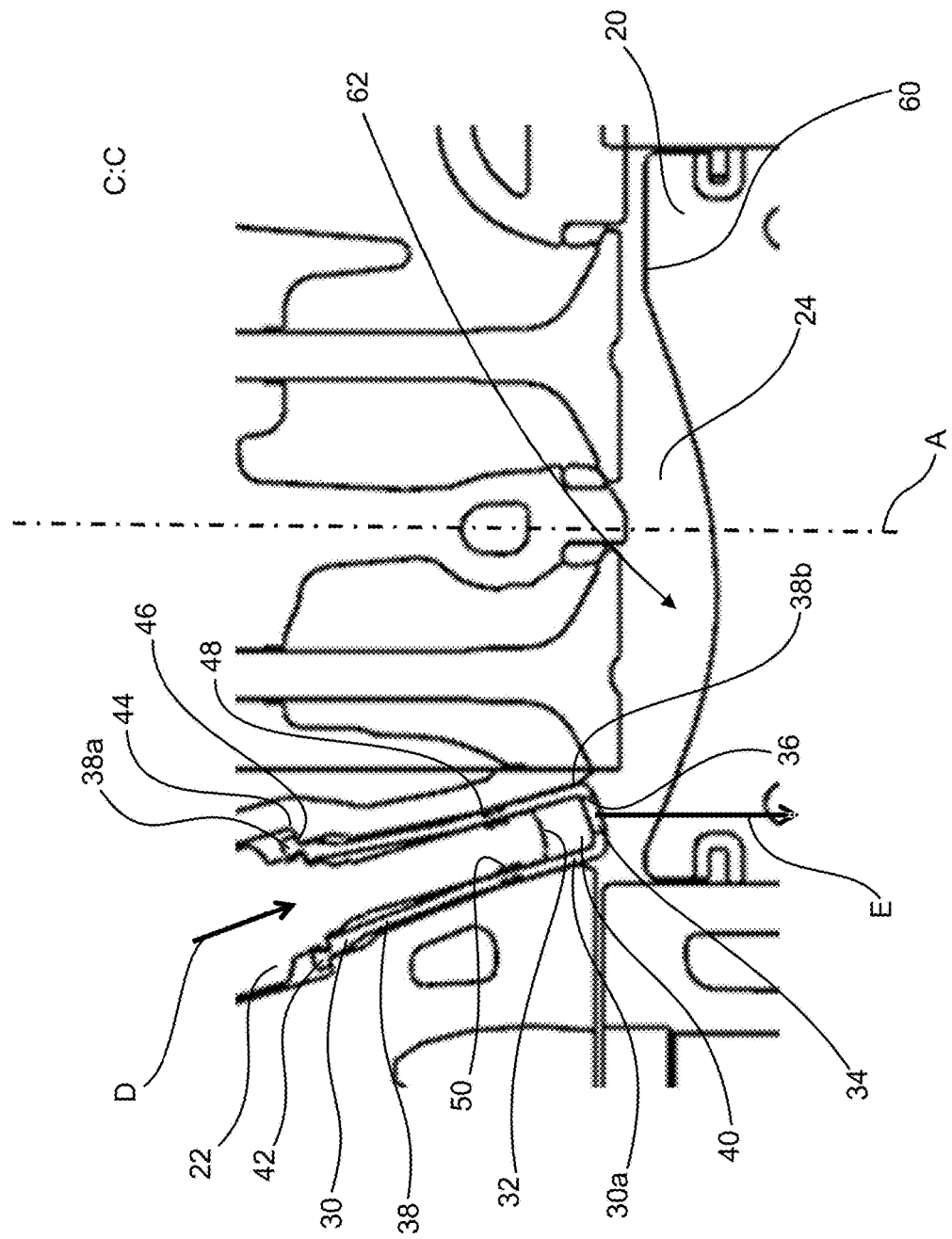
FIG. 9 is a partial view C:C of the internal combustion engine of FIG. 3.

As shown in FIG. 9, the cylinder assembly 23 includes a fuel flow director 30. The fuel flow director 30 is situated in a fuel flow path D between an outlet 32 of the fuel injector 22 and the combustion chamber 24. The fuel injector 22 is oriented such that the injector longitudinal axis B extends at a first angle x in relation to the cylinder longitudinal axis A. The fuel flow director 30 directs fuel flow into the combustion chamber 24 at a second angle in relation to the cylinder longitudinal axis A, indicated in FIG. 9 by arrow E. The second angle is different to the first angle x. That is, the angle at which fuel flow is directed into the combustion chamber 24 by the fuel flow director 30 is different to the angle of the longitudinal axis of the fuel injector 22. The fuel flow director 30 serves to change the direction of fuel flow between the fuel injector 22 and the combustion chamber 24.

Advantageously, the fuel flow director 30 allows the direction of fuel injection into the combustion chamber 24 to be controlled, such that the angle of fuel flow E into the combustion chamber 24 is not solely dependent on the angle of orientation of the fuel injector 22.

Air enters the combustion chamber 24 through the inlet ports 28. Due to other components of the cylinder head such as the inlet valves 26, the fuel injector 22 is oriented at an angle different to that of the cylinder longitudinal axis A. That is, the first angle x is a non-zero, i.e. larger than 0°, angle in relation to the cylinder longitudinal axis A.

In this embodiment, the fuel injector 22 is oriented at an angle of substantially 16° to the cylinder longitudinal axis A in a plane F within which the cylinder longitudinal axis A extends. In this embodiment, the plane F is substantially perpendicular to the crank shaft axis G. In alternative embodiments, the fuel injector is oriented at an angle of between 11° and 21° to the cylinder longitudinal axis A in the plane F. In alternative embodiments, the fuel injector is oriented at some other non-zero angle.

In this embodiment, the fuel injector 22 is oriented at an angle of substantially 3° to the cylinder longitudinal axis A in a plane perpendicular to the plane F, and within which the cylinder longitudinal axis A extends. In alternative embodiments, the fuel injector is oriented at an angle of between 3° and 8° to the cylinder longitudinal axis A in the plane perpendicular to the plane F and within which the cylinder longitudinal axis A extends. In alternative embodiments, the fuel injector is oriented at some other non-zero angle.

In this embodiment, the direction E is substantially parallel to the cylinder longitudinal axis A, i.e. the second angle is substantially 0° in relation to the cylinder longitudinal axis A. It has been found that injecting fuel into the combustion chamber 24 at such an angle optimizes fuel and air mixing.

Figure 10:
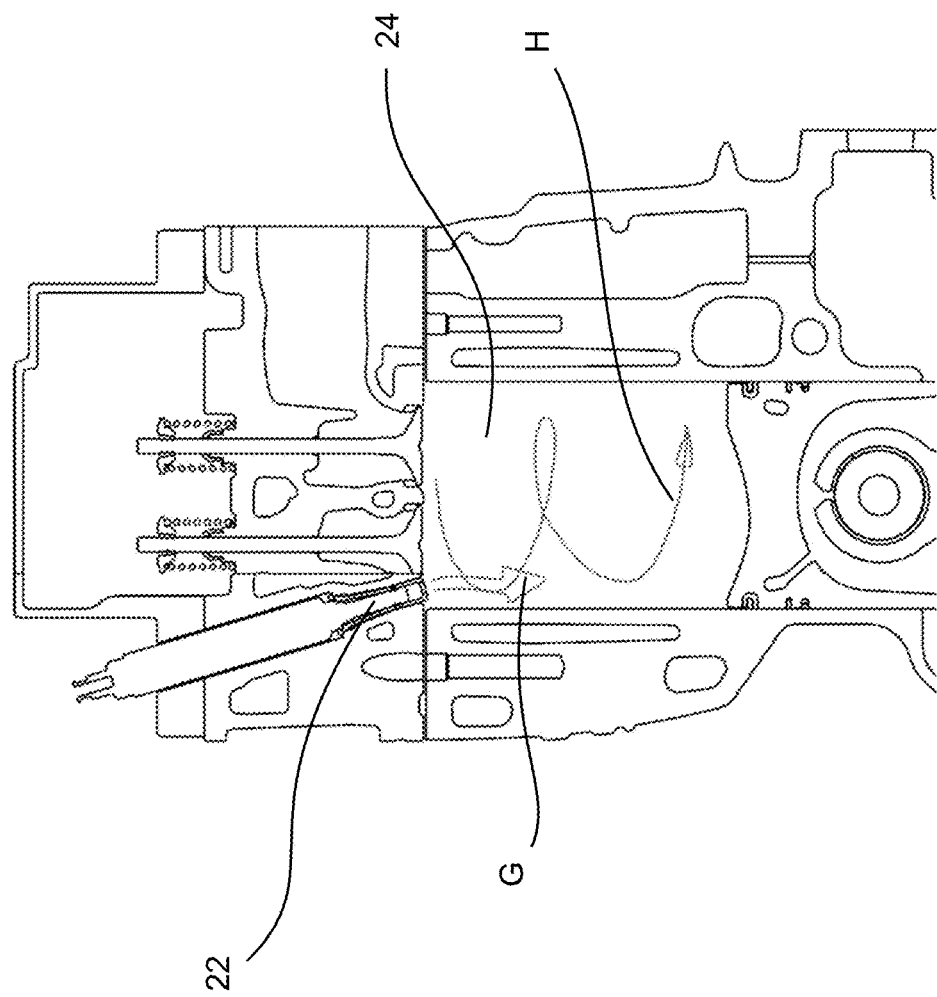
FIG. 10 is a further detail cross-sectional view of the cylinder assembly of FIG. 2.
Figure 11:
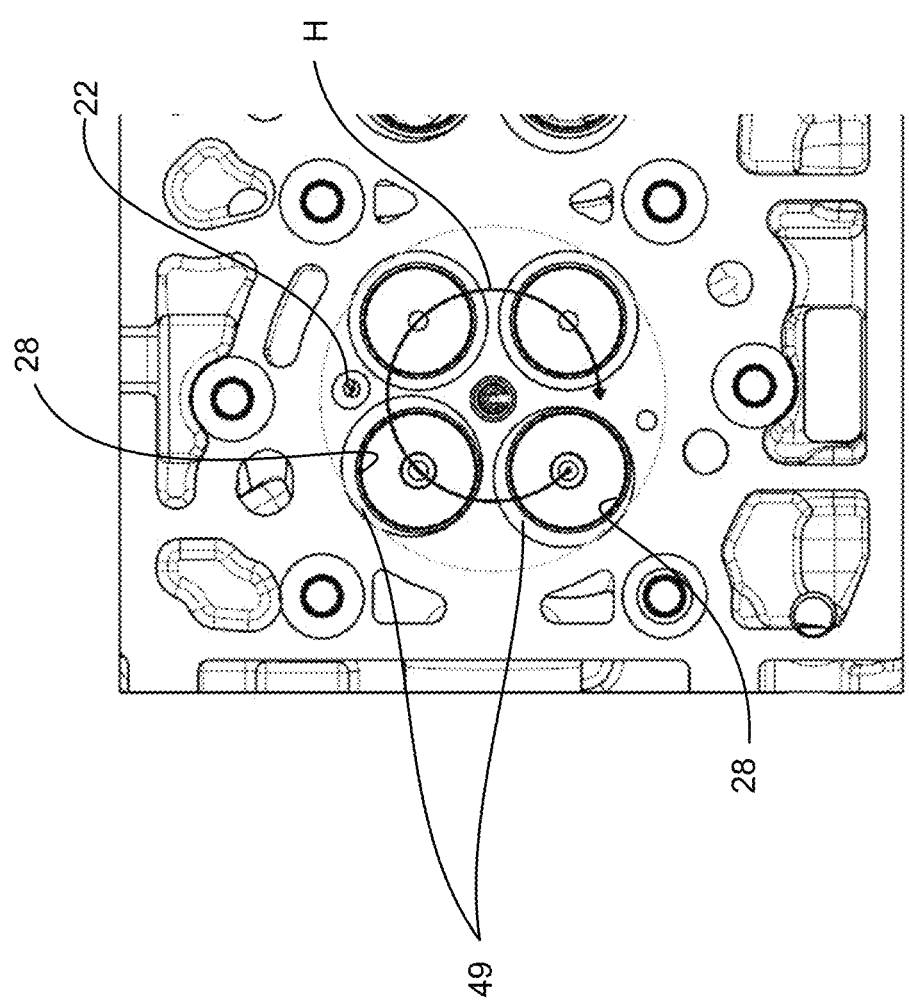
FIG. 11 is an underside flame face view of the cylinder assembly of FIGS. 1 and 2.

Circulation of fuel and air about the combustion chamber 24 is shown in FIGS. 10 and 11. As discussed above, encouraged by the shape of the inlet runners 45, air swirls about the combustion chamber 24 in the direction indicated by arrow H. The swirling motion of air is further encouraged by offset chamfers 49 defined by the inlet ports 28, as shown in FIG. 11. That is, each inlet port 28 defines a chamfer 49 centered about a longitudinal axis that is offset from a longitudinal axis of the inlet port 28.

The direction of fuel injection into the combustion chamber is indicated at arrow G. As shown in FIG. 10, in this embodiment, fuel is injected in a direction G substantially perpendicular to the direction of air swirl motion H. The difference in directions G and H results in greater disruption of the plume of the injected fuel, advantageously increasing homogeneity of the mixture.

In alternative embodiments, the second angle is within some other angle of the cylinder longitudinal axis A. In some embodiments, the second angle is within 5 degrees of the angle of the cylinder longitudinal axis A. In other embodiments, the second angle is within 10 degrees of the angle of the cylinder longitudinal axis A. In some embodiments, the second angle is within 15° of the angle of the cylinder longitudinal axis A. In other embodiments, the second angle is within 30° of the angle of the cylinder longitudinal axis A.

In some embodiments, the second angle is between 30° and 75° of the angle of the cylinder longitudinal axis A.

Directing the flow in each of these directions has been found to improve fuel and air mixing over an arrangement with no direction of fuel.

As shown in FIG. 9, the fuel flow director 30 has an aperture 34 defined by an internal face 36. The aperture 34 is at an outlet end 30a of the fuel flow director 30. The aperture 34 is on the fuel flow path D between the fuel injector 22 and the combustion chamber 24.

Direction of the flow of fuel into the combustion chamber takes place due to the internal face 36. The angle of the internal face 36 effects the direction of fuel flow into the combustion chamber 24. At least a portion of the internal face 36 is at an angle substantially parallel to the second angle, i.e. to the direction E. In this embodiment, the whole of the internal face 36 is at an angle substantially parallel to the second angle. In alternative embodiments, a portion or portions of the internal face 36 are substantially parallel to the second angle.

Providing an aperture on the fuel flow path D having a side wall or internal face at a particular angle is a simple and effective means of directing fuel flow into the combustion chamber 24.

In this embodiment, the fuel flow director 30 has a single aperture 34. In alternative embodiments, the fuel flow director 30 has multiple such apertures 34 on the fuel flow path between the fuel injector 22 and the combustion chamber 24. For example, the fuel flow director has two or more apertures 34.

The cylinder assembly 23 has a sleeve 38 that surrounds the fuel injector 22. The sleeve 38 extends over the outlet 32 of the fuel injector 22. The sleeve 38 of this embodiment includes the fuel flow director 30. That is, the sleeve 38 defines the aperture 34.

The sleeve 38 has a first end 38a that extends over the fuel injector 22, and a second end 38b that defines the aperture 34.

The sleeve second end 38a defines a chamber 40 beyond the fuel injector 22, i.e. between the fuel injector outlet 32 and the aperture 34 by which fuel leaves the sleeve 38. The chamber 40 aids the injection of fuel into the combustion chamber 24. The decrease in diameter between the chamber 40 walls and the aperture 34 leads to an acceleration of fuel as it leaves the fuel injector 22 and enters the combustion chamber 24, improving mixing of fuel and air within the combustion chamber 24. The greater the difference in diameter between the chamber 40 walls, or the volume of the chamber 40, and the area of the aperture 34, i.e. the smaller the relative diameter of the aperture 34, the faster the jet of fuel as it enters the combustion chamber 24. However, the smaller the cross-sectional area of the aperture 34, the greater the risk of fuel disadvantageously remaining within the chamber 40.

In this embodiment, the chamber 40 has a volume of 391 mm3. In this embodiment, the cross-sectional area of the aperture 34 is substantially 22.4 mm2, so that the chamber volume to cross-sectional area ratio is substantially 17.5. Such a ratio has been found to provide optimal conditions for the injection of fuel into the combustion chamber 24, in particular when combined with the angle of the internal face 36.

In alternative embodiments, the chamber volume to cross-sectional area ratio is in the range of 16 to 21. In alternative embodiments, the chamber volume to cross-sectional area ratio is in the range of 17 to 19.

A ratio in this range, in combination with the angle of the internal face 36, has been found to provide optimum introduction of fuel into the combustion chamber 24.

The fuel injector 22 has a nozzle portion 22a and a wider body portion 22b. The nozzle portion 22a is at an outlet end of the fuel injector 22, proximal the combustion chamber 24. In this embodiment, the sleeve 38 extends over the nozzle portion 22a, and does not extend over the wider body portion 22b.

The cylinder assembly of this embodiment has a head adapter 42 for locating the fuel injector 22 with respect to the cylinder head 14. The sleeve 38 includes the head adapter 42, i.e. the head adapter 42 is integral to the sleeve 38.

In this embodiment, the head adapter 42 includes a lip 44 that abuts a shoulder 46 defined by the cylinder head 14 such that movement of the fuel injector 22 towards the combustion chamber 24 is inhibited. The sleeve 38 has a seal or seals 48 between the sleeve 38 and the cylinder head 14. The seal 48 is in this embodiment in the form of an O ring. The sleeve 38 has a further seal 50 in the form of an O ring, between the fuel injector 22 and the sleeve 38. The seal 50 prevents fuel escaping the chamber 40 other than through the aperture 34 to the combustion chamber 24.

Figure 8:
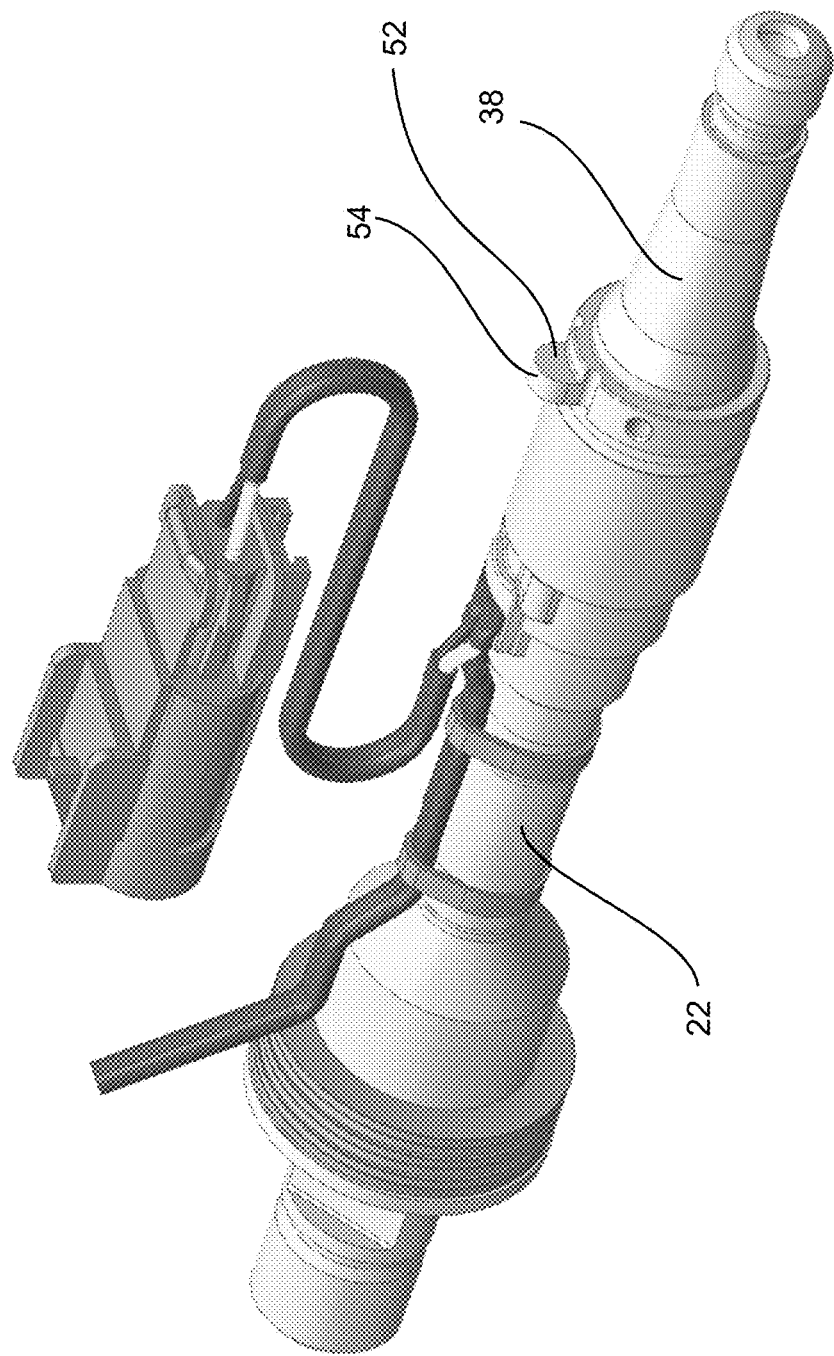
FIG. 8 is an isometric view of a fuel injector for the cylinder assembly of FIGS. 1 to 7.

The fuel injector 22 and the sleeve 38 are shown in further detail in FIG. 8. The cylinder assembly 23 has a sleeve location arrangement 52. The sleeve location arrangement 52 prevents or at least inhibits the rotation of the sleeve 38 about the fuel injector longitudinal axis B. In this embodiment, the sleeve location arrangement 52 has a location feature 54 defined by the sleeve and a corresponding location feature defined by the cylinder head 14 (not shown in this embodiment; shown in the embodiment of FIGS. 12 and 13, described below). In this embodiment, the location feature 54 defined by the sleeve 38 is in the form of a projection 54. The location feature defined by the cylinder head 14 is in the form of a bore for receiving the projection 54. The bore extends along the longitudinal axis B, such that the sleeve 38 can be fitted to the cylinder head 14 along the longitudinal axis B. In this embodiment, the bore is drilled in a shape corresponding to that of the projection 54, in order to receive the projection 54.

In alternative embodiments, the sleeve location arrangement comprises some other suitable arrangement. In an alternative embodiment, the location feature defined by the sleeve is a recess, and the corresponding location feature defined by the cylinder head is in the form of a projection to be received in the recess.

With reference now to FIG. 9, the piston 21 has a crown 60. The crown 60 defines an asymmetric depression 62. The asymmetric depression 62 further promotes mixing of fuel and air within the combustion chamber 24.

The depression 62 is asymmetric within the plane F. The depression 62 has a crown low point 64, i.e. the point of the crown 60 furthest from the cylinder head 14. The crown low point 64 is offset from the cylinder longitudinal axis A within the plane F.

The fuel injector 22 is offset from the cylinder longitudinal axis A in a first radial direction I. The crown low point 64 is offset from the cylinder longitudinal axis A in the first radial direction I. That is, the crown low point 64 is offset from the axis A in a direction towards the fuel injector 22. It has been found that the arrangement of the asymmetric depression 62 being offset with a low point 64 towards the fuel injector 22, in combination with direction of fuel flow in a direction substantially parallel to the cylinder longitudinal axis A, optimizes mixing of fuel and air in a combustion chamber 24.

Figure 12:
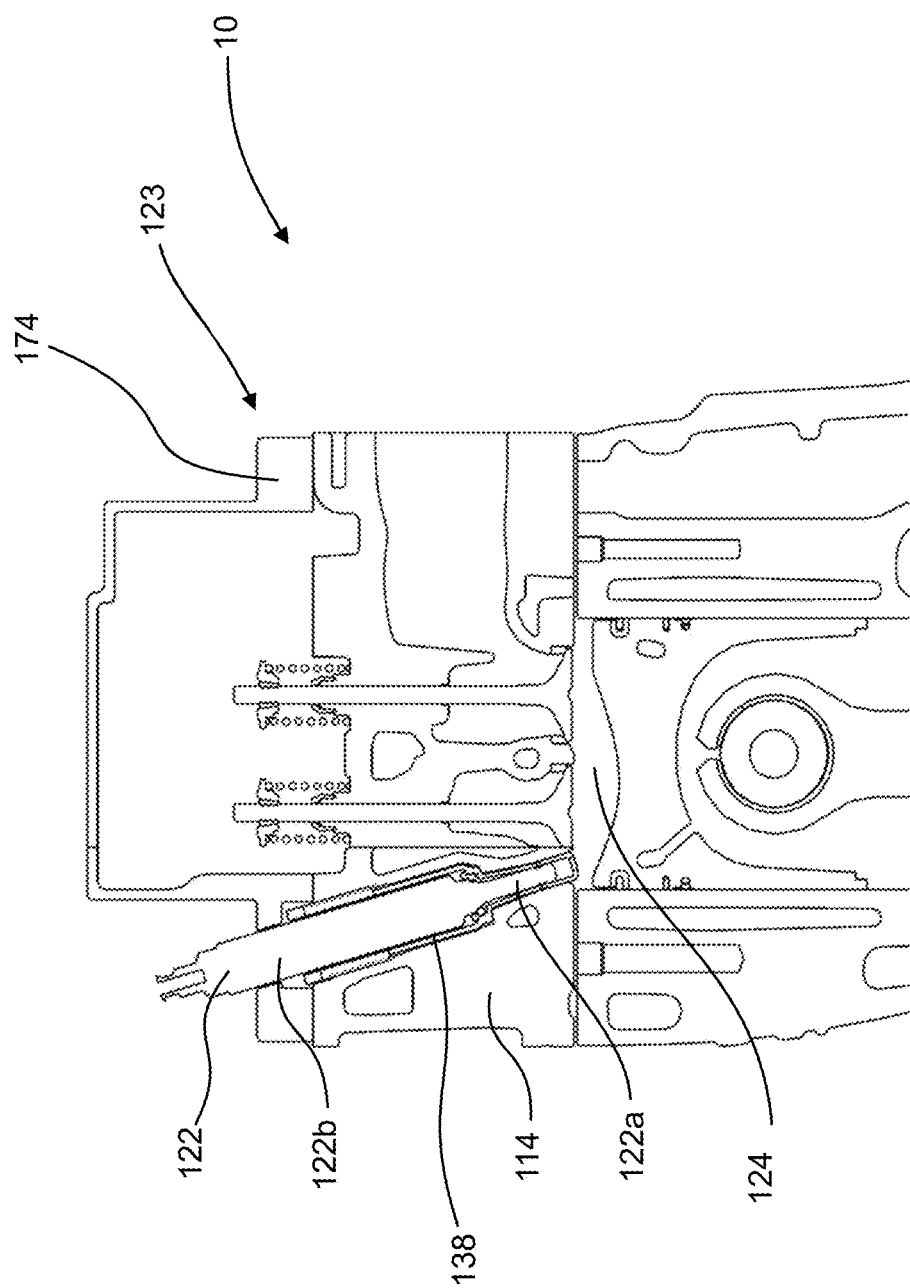
FIG. 12 is a cross-sectional view through a cylinder assembly of an internal combustion engine according to a further embodiment, with a piston at top dead center.

A second embodiment is shown in FIGS. 12 and 13. In this embodiment similar parts are denoted by the same reference numerals to the first embodiment, but with the prefix "1". Only parts which differ from the first embodiment are discussed in detail.

In this embodiment, the sleeve 138 extends at least partway over the body portion 122b of the fuel injector 122 as well as over the nozzle portion 122a. The sleeve 138 serves to locate the fuel injector 122 in within the cylinder head 114. In this embodiment, the cylinder assembly 123 includes a collar 166 for retention of the sleeve 138 and the fuel injector 122 within the cylinder head 114. The collar 166 of this embodiment has an outer threaded surface 168 for engagement with a corresponding threaded surface 170 of the cylinder head 114. The collar 166 defines a slot 172 for engagement with a tool (not shown) for the application of torque, in order to fit the collar 166 in the cylinder head 114. In this embodiment, the slot 172 is milled. In an alternative embodiment, some other suitable machining method is used.

In this embodiment, the collar 166 extends beyond the cylinder head 114. In order to avoid interference during assembly, a rocker cover 174 fitted to the cylinder head 114 defines a recess 176 into which the collar 166 extends. The recess 176 is shaped to allow vertical fitting of the rocker cover 174 to the cylinder head 114, to improve efficiency of assembly.

The collar 166 serves to clamp the sleeve 138 in place and orient the sleeve 138 in a radial direction.

As in the previous embodiment, the cylinder assembly 114 has a sleeve location arrangement 152 to prevent or at least inhibit the rotation of the sleeve 138 about the fuel injector longitudinal axis B. In this embodiment, the location arrangement 152 is in the form of a projection (not shown) that extends into a corresponding bore 156.

A third embodiment is shown in FIG. 14. In this embodiment similar parts are denoted by the same reference numerals to the first embodiment, but with the prefix "2". Only parts which differ from the first embodiment are discussed in detail.

In this embodiment, the fuel flow director 230 is integral to the cylinder head 214. The aperture 234 is defined by the cylinder head 214. That is, the aperture 234 is machined into the cylinder head 214. A chamber 240 is defined by the cylinder head 214 between the fuel injector outlet 232 and the aperture 234. Advantageously, the fuel flow direction 230 being integral to the cylinder head 214 reduces the number of components required whilst providing the advantage of directing fuel into the combustion chamber 224.

The invention claimed is:

1. An internal combustion engine for use with hydrogen fuel, the engine having at least one cylinder assembly, the or each cylinder assembly comprising: a combustion chamber comprising a cylinder, a cylinder head and a reciprocating piston assembly, the cylinder defining a cylinder longitudinal axis; a fuel injector for injecting fuel into the combustion chamber, the fuel injector defining an injector longitudinal axis; and a fuel flow director, wherein the fuel flow director is located in the fuel flow path between an outlet of the fuel injector and the combustion chamber; wherein the fuel injector is oriented such that the injector longitudinal axis extends at a first angle; and wherein the fuel flow director is configured to direct fuel flow into the combustion chamber at a second angle, different to the first angle; wherein the first angle is a non-zero angle in relation to the cylinder longitudinal axis, and wherein the second angle is within 30° of the angle of the cylinder longitudinal axis; and further wherein the cylinder assembly comprises a sleeve surrounding the fuel injector, the sleeve comprising the fuel flow director, the sleeve having a first end that extends over the fuel injector and a second end that extends beyond an outlet of the fuel injector, the second end comprising the fuel flow director, and wherein the second end of the sleeve defines a chamber between the fuel injector outlet and the fuel flow director.

2. The internal combustion engine according to claim 1, wherein the second angle is within 15° of the angle of the cylinder longitudinal axis.

3. The internal combustion engine according to claim 1, wherein the second angle is substantially parallel to the cylinder longitudinal axis.

4. The internal combustion engine according to claim 1, wherein the fuel flow director comprises an aperture defined by an internal face, wherein, in use, fuel enters the combustion chamber through the aperture, and wherein the internal face is configured to direct fuel flow into the combustion chamber at the second angle.

5. The internal combustion engine according to claim 4, wherein the fuel flow director comprises only one aperture.

6. The internal combustion engine according to claim 4, wherein at least a portion of the internal face is substantially parallel to the second angle.

7. The internal combustion engine according to claim 1, wherein the cylinder assembly comprises a head adaptor for locating the fuel injector with respect to the cylinder head, and wherein the head adaptor is integral to the sleeve.

8. The internal combustion engine according to claim 1, wherein the cylinder assembly comprises a sleeve location arrangement configured for the prevention of rotation of the sleeve about the fuel injector longitudinal axis, the sleeve location arrangement comprising a location feature defined by the sleeve and a corresponding location feature defined by the cylinder head.

9. The internal combustion engine according to claim 1, wherein the fuel flow director is integral to the cylinder head.

10. The internal combustion engine according to claim 1, wherein the piston comprises a crown, and wherein the crown defines an asymmetric depression, wherein the crown has a plane through which the cylinder longitudinal axis extends, and the depression is asymmetric within the plane.

11. The internal combustion engine according to claim 10, wherein the depression comprises a crown low point distal the cylinder head and within said plane, and wherein the crown low point is offset from the cylinder longitudinal axis.

12. The internal combustion engine according to claim 11 wherein the fuel injector is offset from the cylinder longitudinal axis in a first radial direction, and wherein the crown low point is offset from the cylinder longitudinal axis in the first radial direction.

* * * * *